United States Patent [19]

Kanamaru

[11] 4,334,301
[45] Jun. 8, 1982

[54] OPTICAL READING APPARATUS WITH SCANNER LIGHT INTENSITY CONTROL

[75] Inventor: Hitoshi Kanamaru, Tokorozawa, Japan

[73] Assignee: Pioneer Electronic Corporation, Tokyo, Japan

[21] Appl. No.: 180,741

[22] Filed: Aug. 25, 1980

Related U.S. Application Data

[62] Division of Ser. No. 887,401, Mar. 16, 1978, abandoned, which is a division of Ser. No. 743,025, Nov. 18, 1976, Pat. No. 4,093,961.

[30] Foreign Application Priority Data

Nov. 21, 1975 [JP] Japan .................................. 50-139314

[51] Int. Cl.³ .............................................. G11B 7/12
[52] U.S. Cl. .................................. 369/116; 369/106; 369/120
[58] Field of Search ............................. 369/106–107, 369/116, 109–111, 120; 358/128.5, 128.6, 127, 130–132; 250/201

[56] References Cited

U.S. PATENT DOCUMENTS 2,242,638  5/1941  Balsley .
2,274,530  2/1942  Collins .
2,360,012  10/1944  Reiskind .
3,882,317  5/1975  Camerik et al. .
4,051,329  4/1977  Blondet et al. .

Primary Examiner—Raymond F. Cardillo, Jr.
Attorney, Agent, or Firm—Sughrue, Mion, Zinn, Macpeak and Seas

[57] ABSTRACT

An optical scanner A for a video recording disc B includes a photo detector 6 for sensing the light from a laser source 1 reflected back from the disc. The low frequency and d.c. components of the photo detector output are compared with a reference voltage to derive an error signal. The latter, after compensation, amplification, and limiting, is applied to a regulator 23 to control the laser source discharge current, and thereby its intensity.

2 Claims, 7 Drawing Figures

OPTICAL READING APPARATUS WITH SCANNER LIGHT INTENSITY CONTROL

This is a division of application Ser. No. 887,401, filed Mar. 16, 1978, now abandoned, which is a division of application Ser. No. 743,025, filed Nov. 18, 1976, now U.S. Pat. No. 4,093,961.

BACKGROUND OF THE INVENTION

1. Field of the Invention

The present invention relates to an optical signal readout apparatus for a video long playing record in which the recorded signal is detected by a laser beam. 2. Description of the Prior Art An example of a conventional optical signal readout apparatus is shown in block diagram form in FIG. 1. A rotary disc B having information recorded thereon is driven by an electric motor C, and the information is read out by a reading apparatus A. The information is recorded in the form of pits or depressions b arranged along a plurality of coaxial or spiralling tracks B1, B2, etc. on the disc B, as shown in FIG. 2. Each information pit b has some optically detectable property different from that of the area surrounding it, such as light reflectivity, light absorptivity or light refractivity, and/or has a different physical structure, such as a recess or land. The recorded information is represented by the specific repetition rate of the pits along the direction of the tracks B1, B2 etc., i.e., the wavelength or distance between adjacent pits, and/or the length of each pit.

A bundle of light beams emanating from a source 1, such as a helium or neon laser, is passed through a collimator 2 and a beam splitter 3 to a movable mirror 4 and a condenser lens 5. The condenser lens serves to focus the collimated light beam onto the rotary disc B as a fine spot.

When the disc B is driven by the motor C, the focused laser spot sequentially scans the pits b along, for example, track B2. Assuming that the pits have a reflectivity different from that of the surrounding areas, the light reflected back from the disc is gathered or collected by the condenser lens 5. The collected light is reflected by the movable mirror 4 and separated by the beam splitter 3. The separated light is directed onto a photo detector 6, from which an electrical signal representative of the information recorded by the scanned pits b is obtained.

The photo detector 6 comprises a pair of photo detecting elements 6a and 6b. The electrical signals corresponding to the reflected light beams incident on the respective detecting elements are amplified by amplifiers 7 and 8. Each of the amplified signals is supplied to both an adder 9 and a subtractor 10. The output of the adder 9, which is the sum of the outputs of the amplifiers 7 and 8, represents the information recorded on the rotary disc B, while the output of the subtractor 10 is employed as a tracking signal. That is, at a given instant during the scan of the information track B2, the reflected light pattern projected onto the photo detector 6 is as shown in FIG. 3. Since the brightness of the pits b differ from that of the surrounding area, the output of the adder 9 thus represents the recorded information signal.

When the center line of the information track B2 coincides with the boundary line separating the photo detecting elements 6a and 6b, as shown in FIG. 3, the output of the subtractor 10 will be zero. When, however, the boundary line is shifted with respect to the center line of the track, a difference signal will appear at the output of the subtractor 10 whose amplitude is proportional to the magnitude of the shift and whose polarity indicates the direction thereof. This difference signal is used to control the scanner tracking.

More specifically, the difference signal is supplied to a tracking control device 11. The low frequency component of the output signal from the tracking control device 11 is applied to an amplifier 12 as a coarse tracking signal, whose output drives a feeding device 13 to radially shift the reading apparatus A in a direction normal to the tracks on the rotary disc B. The high frequency component of the output signal from the tracking control device 11 is applied to an amplifier 14, whose output is supplied to a driving device 15 which controls the movable mirror 4 to implement fine tracking.

In the conventional readout apparatus described above, the detected information signal may include some irregularities or variations due to variations in the light intensity from the source 1 and/or variations in the reflectivity of the recording areas on the rotary disc B. The level of such variations may decrease with time due to the aging and degradation of the light source 1, but this in turn degrades the quality of the reproduced information. Further, the light intensity incident on the photo detector 6 may sometimes exceed an upper tolerance limit, and in such cases there is a possibility of burning the photo detecting elements 6a and 6b.

SUMMARY OF THE INVENTION

The present invention is intended to resolve the above problems by providing an improved optical signal readout apparatus in which the intensity of the light incident on the photo detector is detected, and the detected light intensity signal is compared with a reference signal to maintain the average light intensity constant in a control loop fashion.

The low frequency and d.c. components of the photo detector output are proportional to the average light intensity incident thereon, and an error signal derived from the comparison thereof with a reference voltage is compensated, amplified, and limited, and applied to a regulator to control the discharge current of a laser light source. This maintains a constant, predetermined light intensity to thereby optimize the information readout and protect the photo detector from burnout.

The comparison signal may be derived directly from the photo detector via resistive elements to minimize temperature drift, or an auxilliary photo detector may be employed which is particularly stable and sensitive to low frequencies.

DETAILED DESCRIPTION OF THE PREFERRED EMBODIMENTS

Figure 1:
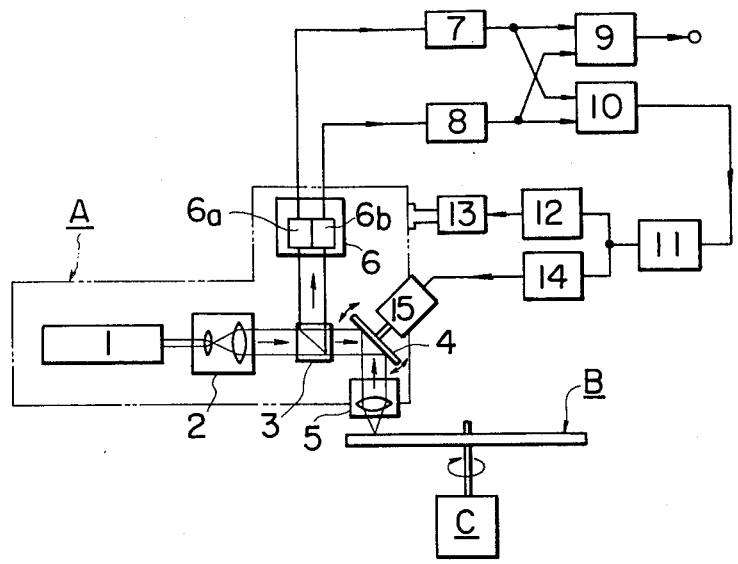
FIG. 1 shows a block diagram of a conventional optical readout apparatus.
Figure 2:
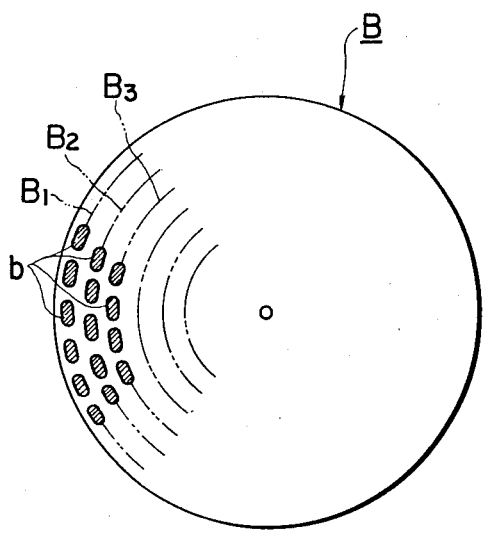
FIG. 2 shows an exaggerated top view of a typical video recording disc.
Figure 3:
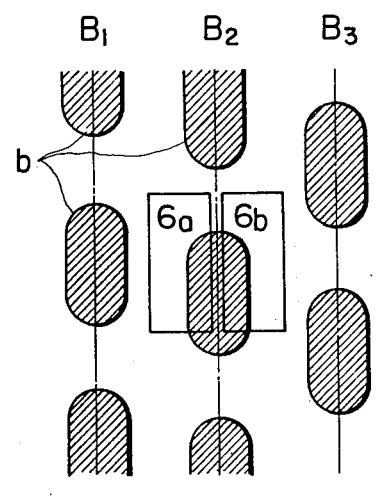
FIG. 3 shows an explanatory view of a signal image projected onto a prior art photo detector.
Figure 4:
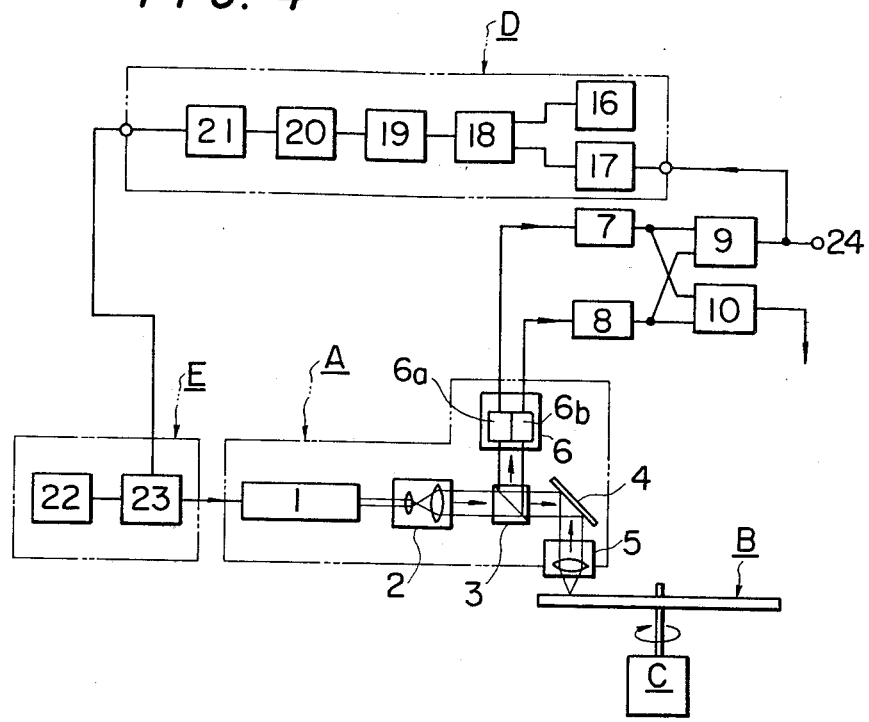
FIG. 4 shows a block diagram of a first embodiment of the present invention.
Figure 5:
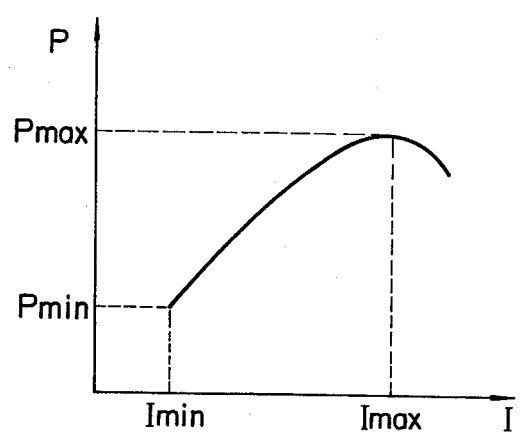
FIG. 5 is a characteristic curve plot of the light source.

Referring again to the drawings, FIG. 4 shows a first embodiment of the present invention in which the tracking circuitry has been omitted for simplicity and convenience. In FIG. 4, there are shown a light intensity control circuit D and a power supply circuit E. The current from a high voltage power source 22 in the power supply circuit E is controlled by a current regulator 23 whose output is employed as the discharge current for the light source 1. In general, the light intensity P of the source 1 varies in a substantially linear manner between a minimum current Imin and maximum current Imax, as shown in FIG. 5. By continuously varying the current within this range, the light intensity P can be continuously regulated from Pmin to Pmax.

The signal supplied to the light intensity control circuit D is derived from the adder 9. This signal includes a d.c. component from the photo detector 6. As such, it is possible to obtain a detection signal proportional to the amount of actually reflected light, i.e. the average light superimposed by the varying light component, incident on the photo detector 6. Thus, a signal proportional to the total amount of light received by the photo detecting elements 6a and 6b is supplied to the light intensity control circuit D.

The high frequency components of the input signal, which represent the recorded information, are filtered out by a filter 17, so that only a signal corresponding to any variation or irregularity of the incident light, generally a low frequency signal including a d.c. component, is supplied as one input to an error signal detector 18. The other input to the detector 18 is supplied from a reference signal generator 16, and corresponds to a desired average light intensity for, or to be incident on, the photo detecting elements 6a and 6b. An error signal corresponding to a deviation from this desired average light intensity appears at the output of the error signal detector 18.

This error signal is used as a control signal, after passing through a compensating circuit 19, an amplifier 20 and a limiter 21 to the current regulator 23. The compensating circuit 19 serves to optimize the characteristics of the control loop, while the limiter 21 controls the range of variation of the control voltage such that the control current is held within the ordinal operating range between Imin and Imax.

The error signal supplied the current regulator 23 of the power supply E controls the discharge current flowing through the light source 1 to thereby regulate the light intensity output thereof. As a result, the average amount of light incident on the photo detecting elements 6a and 6b is maintained at a predetermined value.

In this manner, the average amount of light incident on the photo detector 6 is kept at a constant value, even when there are variations in the light output of the source 1, characteristic changes in the light source with time and/or variations in the reflectivity of the rotary disc B. Collaterally, the amplitude of the information signal obtained at the adder output 24 is also kept at a constant level. Further, since the photo detecting elements 6a and 6b are always irradiated with an average light intensity safely below their tolerance level, the problem of burnout is also eliminated.

Figure 6:
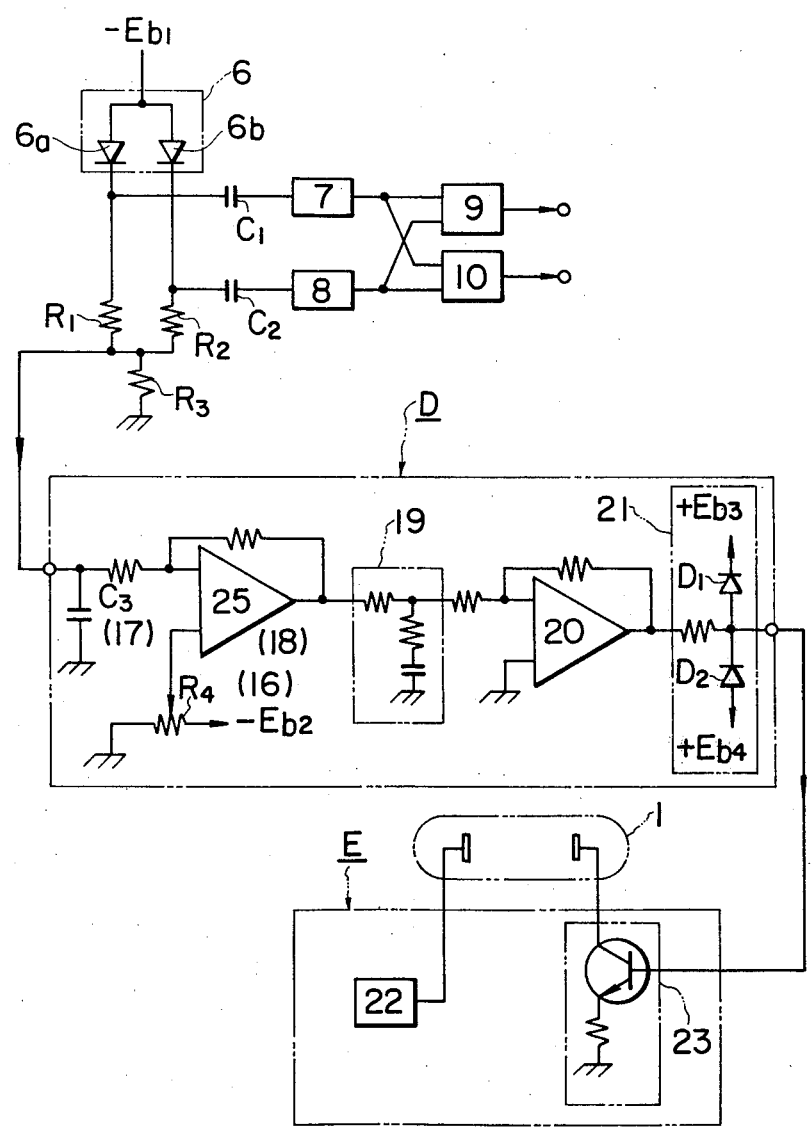
FIG. 6 shows a block schematic circuit diagram of a second embodiment of the invention.

FIG. 6 shows a second embodiment of the present invention, in which the output of the photo detector 6 is directly utilized as a control signal. As previously mentioned, it is necessary to channel the d.c. component from the photo detector 6 to the light intensity control circuit D. In the embodiment shown in FIG. 4, the amplifiers 7 and 8, the adder 9, and the subtractor 10 are included in this d.c. current path. Since the amplifiers 7 and 8 typically have a high gain and a wide bandwidth, their characteristics in the low frequency and d.c. range, such as temperature drift, are usually poor, and it is thus sometimes difficult to satisfy the previously mentioned conditions.

In FIG. 6, load resistors R1 and R2 connected to the cathodes of the photo detecting elements 6a and 6b, which are negatively biased wwith a −Eb1 potential, are coupled to a summing resistor R3, from which an input signal is derived for the light intensity control circuit D. Coupling capacitors C1 and C2 block the low frequency and d.c. components, so that the entire low frequency component is fed to the control circuit D and only the high frequency components are passed to the amplifiers 7 and 8. That is, a detection signal voltage proportional to the sum of the currents from the photo detecting elements 6a and 6b, and representative of the total amount of light incident on the photo detector 6, is taken from the summing resistor R3 and supplied to the control circuit D. Since the portion of the circuit from which the detection signal is obtained comprises only resistors, there is no appreciable temperature drift, whereby the detection signal has a high degree of fidelity.

In the light intensity control circuit D shown in FIG. 6, the capacitor C3, the potentiometer R4, and the differential amplifier 25 correspond to the filter 17, the reference voltage generator 16 and the error signal detector 18, respectively. The high frequency components of the input signal are shunted to ground by the capacitor C3, so that only the low frequency components, corresponding to the average light intensity, are supplied to the differential amplifier 25. The error signal output from the amplifier 25 is passed through the compensating circuit 19 and the amplifier 20 to the limiter 21. In the latter, the amplitude of the error signal is limited by the diodes D1 and D2 to a value lower than +Eb3 but higher than +Eb4, and its output is supplied as a control voltage to the current regulator 23 in the power supply E. The regulator 23 comprises a transistor circuit which serves to regulate the discharge current through the light source 1.

In this manner, the average amount of light incident on the photo detector 6 is maintained at a constant value determined by the setting of the potentiometer R4. Since the summing resistor R3 is used together with the load resistors R1 and R2, a stable detection signal is obtained proportional only to the light intensity.

Figure 7:
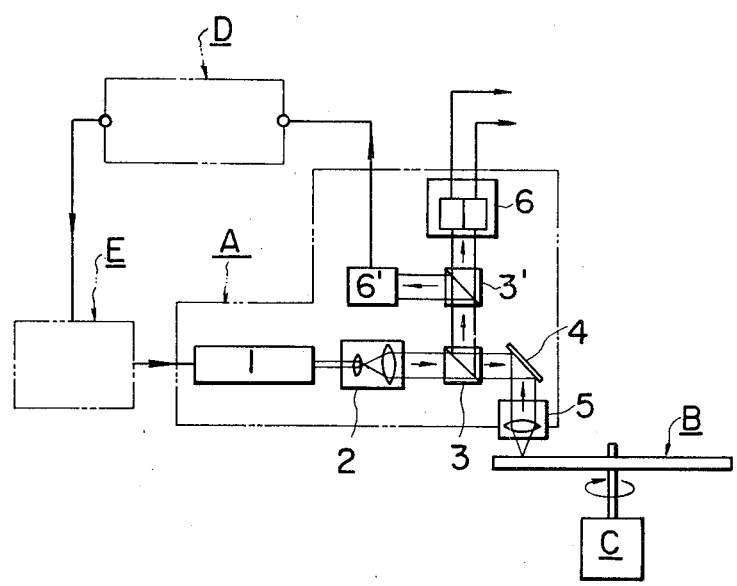
FIG. 7 shows a block diagram of a third embodiment of the invention.

FIG. 7 shows a third embodiment of the invention in which an additional beam splitter 3' and an additional photo detector 6' are utilized. The beam splitter 3' is disposed between the beam splitter 3 and the photo detector 6 to reflect a portion of the light beam bundle onto the photo detector 6'. The output of the latter is supplied to the light intensity control circuit D as a signal representative of the intensity of the light beam bundle.

In the embodiment of FIG. 7, a photo detector 6 best suited to sense only the relatively high frequency, low amplitude information signal may be employed, and similarly a photo detector 6' best suited to sense only the relatively low frequency, high amplitude average light intensity signal may be used. Thus, wide band, high sensitivity and low noise characteristics are required for the photo detector 6. Since the average light intensity signal comprises relatively low frequency and d.c. components, a high stability factor is required for the photo detector 6'. These different requirements are easily satisfied by the separate detector selections enabled by the embodiment of FIG. 7.

In the embodiments shown in FIGS. 4 and 6, the light intensity control signal is obtained from the combined outputs of the two photo detecting elements 6a and 6b, and the tracking control signal is similarly obtained. If tracking control is accomplished by using a separate, auxiliary light spot, however, as well known in the art, then the photo detecting elements 6a and 6b may be replaced by a single element. If this alternative is used in the embodiment of FIG. 4, then either of the amplifiers 7 or 8, the adder 9, and the subtractor 10 may be omitted. Applying this alternative to the embodiment of FIG. 6, either of the capacitors C1 and C2 and either of the load resistors R1 or R2 may also be omitted.

What is claimed is:

1. In an optical signal readout apparatus including a source of laser light, a rotary disc record, a photo detector, and an optical scanner for focusing light from the source onto the record and directing light reflected back from the record onto the photo detector, the improvements characterized by:
    (a) means for extracting the low frequency and d.c. components from the photo detector output signal, said extracted components being proportional to the average light intensity incident on the photo detector,
    (b) means for comparing the extracted components with a reference voltage to derive an error signal,
    (c) means for regulating the intensity of the source of laser light in response to the error signal, to thereby maintain the light intensity on the photo detector substantially constant,
    (d) means for compensating, amplifying and limiting the error signal to a predetermined range, to thereby prevent the burnout of the photo detector, and
    (e) means for regulating comprises a transistor circuit for controlling the discharge current from the source of laser light.

2. An optical signal readout apparatus as defined in claim 1, wherein the means for extracting comprises a resistor network coupled to the photo detector, and a shunt capacitor coupled to the output of the resistor network for grounding high frequency components, whereby temperature drift is minimized.

* * * * *